United States Patent [19]
Nomura

[11] Patent Number: 5,107,453
[45] Date of Patent: Apr. 21, 1992

[54] DATA PROCESSOR CAPABLE OF EXECUTING DIVISION OF SIGNED DATA WITH A SMALL NUMBER OF PROGRAM STEPS

[75] Inventor: Masahiro Nomura, Tokyo, Japan
[73] Assignee: NEC Corporation, Tokyo, Japan
[21] Appl. No.: 379,114
[22] Filed: Jul. 13, 1989
[30] Foreign Application Priority Data
  Jul. 13, 1988 [JP] Japan .................. 63-175804
[51] Int. Cl.⁵ .............................................. G06F 7/52
[52] U.S. Cl. ................................................ 364/764
[58] Field of Search ...................... 364/761, 764, 736
[56] References Cited
  U.S. PATENT DOCUMENTS
  4,742,480  5/1988  Vaughn et al. .............. 364/764
  4,992,968  2/1991  Adiletta ...................... 364/761
  4,992,969  2/1991  Yamahata .................... 364/761

*Primary Examiner*—Tan V. Mai
*Attorney, Agent, or Firm*—Foley & Lardner

[57] ABSTRACT

A data processor using a temporary register for temporarily storing a dividend data and a divisor data, sign flags for indicating respective signs of the dividend and the divisor, and an arithmetic and logic unit (ALU) coupled to the temporary register and having an arithmetic logic operation function required for execution of a division operation and a two's compliment obtaining operation. A microsequencer is provided to control the ALU so as to cause the ALU to execute a given instruction. The microsequencer generates a two's complement obtaining operation instruction signal, and an operation control circuit is coupled to the sign flags and is connected to receive the two's complement obtaining operation instruction signal. The operation control circuit operates to control the ALU in accordance with an output of the sign flags so as to cause the ALU to execute a two's complement obtaining operation, or to substantially invalidate the two's complement obtaining operation of the ALU regardless of the two's complement obtaining operation instruction signal.

10 Claims, 5 Drawing Sheets

DATA PROCESSOR CAPABLE OF EXECUTING DIVISION OF SIGNED DATA WITH A SMALL NUMBER OF PROGRAM STEPS

BACKGROUND OF THE INVENTION

1. Field of the Invention

The present invention relates to a data processor, and more specifically to a system for executing a division of signed data in a microprogram controlled microcomputer.

2. Description of Related Art

Hitherto, microprogram controlled microcomputers have an instruction execution unit composed of a temporary register group having a shift function and used for temporarily storing items of operand data such as a dividend, a divisor, etc., an arithmetic logic unit (ALU), a so called SS flag indicative of an exclusive-OR between respective signs of the dividend and the divisor stored in the temporary register group, a so called SD flag showing the sign of the divisor, and a microsequencer controlling an overall operation of the execution unit. Information hold in the SS flag and the SD flag is supplied to the microsequencer.

In the above mentioned conventional microcomputer, division of signed data has been executed in the following manner under a microprogram control. In a first step and a second step, the microsequencer controls to transfer a dividend data and a divisor data to the temporary register group, and to set the sign data to the SS flag and SD flag. In a third step and a fourth step, the microsequencer examines a most significant bit (MSB) of the dividend, and if the MSB of the dividend is "1" which indicates that the dividend is negative, a branch processing is started in the microprogram, so that the ALU generates a two's complement of the dividend. Furthermore, in a fifth step and a sixth step, the microsequencer examines a MSB bit of the divisor, and if the MSB of the divisor is "1" which indicates that the divisor is negative, a branch processing is also started in the microprogram, so that the ALU generates a two's complement of the divisor. As the result of the above processing, the dividend and the divisor in the form of an absolute value are obtained. In a seventh step, a division operation of the dividend by the divisor is executed in accordance with a so-called restoring method by utilizing the shift function of the temporary register group and the ALU. In an eight step and a ninth step, after execution of the division operation, a quotient is stored in the temporary register group, and the microsequencer corrects a sign of the quotient with reference to a content of the SS flag as follows:

(a) In the case of the SS flag = "1"

A branch processing is started in the microprogram, so that a two's complement of the quotient is generated, and then, stored in the temporary register group.

(b) In the case of the SS flag = "0"

No processing is executed for the quotient.

In a tenth step and an eleventh step, the microsequencer corrects a sign of the remainder stored in the temporary register group, with reference to a content of the SD flag as follows:

(a) In the case of the SD flag = "1"

A branch processing is started in the microprogram, so that a two's complement of the remainder is generated, and then, stored in the temporary register group.

(b) In the case of the SD flag = "0"

No processing is executed for the remainder.

As seen from the above description, in the signed data division operation of the conventional microprogram controlled microcomputer, when the absolute values of the dividend and the divisor are generated on the basis of the sign examination of the dividend and the divisor, and when the signs of the quotient and the remainder obtained after the division operation are corrected, a condition discrimination and a conditional branch are executed in accordance with the microprogram. However, the condition discrimination and the conditional branch require a number of instruction execution clocks and a number of microprogram steps. As a result, the microcomputer have had an inevitably decreased operation speed, and an increased amount of microprogram has been required for the microcomputer.

SUMMARY OF THE INVENTION

Accordingly, it is an object of the present invention to provide a data processor which has overcome the above mentioned defect of the conventional one.

Another object of the present invention is to provide a data processor capable of executing a division of signed data with decreased microprogram steps and at an increased operation speed.

The above and other objects of the present invention are achieved in accordance with the present invention by a data processor comprising data storage means for temporarily storing a dividend data and a divisor data, sign information storage means coupled to the data storage means for detecting a sign of each of the dividend data and the divisor data and storing the detected sign information, arithmetic and logic operation execution means coupled to the data storage means and having an arithmetic logic operation function required for execution of a division operation and a two's compliment obtaining operation, instruction execution control means coupled to the arithmetic and logic operation execution means for controlling the arithmetic and logic operation execution means so as to cause the arithmetic and logic operation execution means to selectively execute a given instruction, the instruction execution control means generating a two's complement obtaining operation instruction signal, and operation control means coupled to the sign information storage means and to receive the two's complement obtaining operation instruction signal and operating to control the arithmetic and logic operation execution means in accordance with an output of the sign information storage means so as to cause the arithmetic and logic operation execution means to execute a two's complement obtaining operation, or to substantially invalidate the two's complement obtaining operation of the arithmetic and logic operation execution means regardless of the two's complement obtaining operation instruction signal.

With the above arrangement, the required number of microprogram steps for the instruction execution control means is decreased, and therefore, the division of signed data can be executed at a high speed.

The above and other objects, features and advantages of the present invention will be apparent from the following description of preferred embodiments of the invention with reference to the accompanying drawings.

DESCRIPTION OF THE PREFERRED EMBODIMENTS

Figure 1:
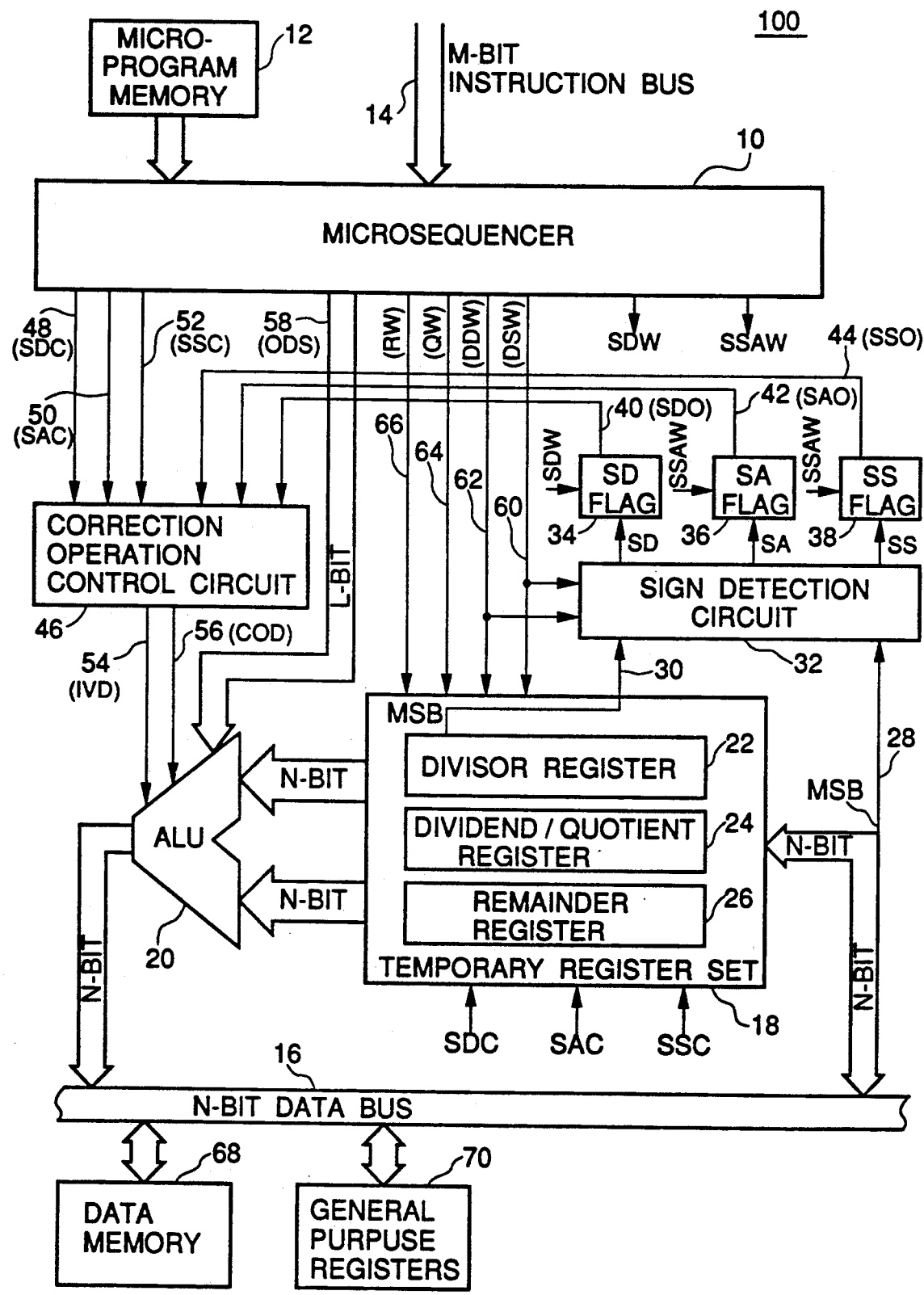
FIG. 1 is a block diagram of an embodiment of the instruction execution unit of the data processor in accordance with the present invention.

Referring to FIG. 1, there is shown a block diagram of an embodiment of an instruction execution unit of the data processor in accordance with the present invention. The execution unit 100 is generally indicated by Reference Numeral 100, which includes a microsequencer 10 associated with a microprogram memory 12 and adapted to read a required microprogram from the microprogram memory 12. The microsequencer 10 is also coupled to an instruction bus 14 of M bits to receive a given instruction through the instruction bus 14. In order to execute the given instruction supplied through the instruction bus 14, the microsequencer 10 reads a microprogram from the associated microprogram memory 12, and generates various control signals as the result of decoding of the microprogram. For simplification of the drawing, however, only signals required for execution of the division of signed data are shown in FIG. 1, and will be explained in the following description.

The execution unit 100 also includes a data bus 16 of N bits, a temporary register set 18 coupled to the data bus 16, and an arithmetic logic unit (ALU) 20 having a pair of N-bit inputs connected to the temporary register set 18 and an N-bit output connected to the data bus 16. The temporary register set 18 includes a divisor register 22, a dividend/quotient register 24 and a remainder register 26.

A most significant bit (MSB) of the data bus 16 and a MSB bit of the divisor register 22 are connected through lines 28 and 30 to a sign detection circuit 32, respectively. The sign detection circuit 32 generates three sign signals SD, SA and SS to a divisor sign flag (SD flag) 34, a dividend sign flag (SA flag) 36 and a quotient sign flag (SS flag) 38, respectively. Outputs SDO, SAO and SSO of these flags 34, 36 and 38 are connected through lines 40, 42 and 44 to a correction operation control circuit 46, which is also connected to receive a divisor/remainder two's complement data generation instruction signal SDC, a dividend two's complement data generation instruction signal SAC and a quotient two's complement data generation instruction signal SSC, through lines 48, 50 and 52 from the microsequencer 10, respectively. The SDC signal, the SAC signal and the SSC signal are furthermore supplied to the temporary register set 18. On the other hand, the correction operation control circuit 46 generates an operation invalidation signal IVD and a complement obtaining operation signal COD, which are supplied through lines 54 and 56 to the ALU 20.

In addition, the microsequencer 10 outputs an operation mode designation signal ODS through a bus 58 of L bits to the ALU 20, and also generates a divisor write signal DSW, a dividend write signal DDW, a quotient write signal QW, a remainder write signal RW, an SD flag write signal SDW and an SA/SS flag write signal SSAW. The DSW signal, the DDW signal, the QW signal and the RW signal are supplied to the temporary register set 18 through lines 60, 62, 64 and 66, respectively. The DDW signal and the DSW signal are also supplied to the sign detection circuit 32. The SDW signal is supplied to the SD flag 34, and the SSAW signal is supplied to the SA flag 36 and the SS flag 38. Furthermore, a data memory 68 and a general purpose registers 70 are connected to the data bus 16.

The divisor register 22 of the temporary register set 18 are used to temporarily store a divisor supplied on the data bus 16, in response to the DSW signal which is generated by the microsequencer 10 when the divisor should be written from the data bus 16 to the divisor register 22. The dividend/quotient register 24 of the temporary register set 18 is used to temporarily store a dividend supplied on the data bus 16, in response to the DDW signal which is generated by the microsequencer 10. The remainder register 26 is used to temporarily store a remainder generated as the result of the division operation. In addition, the dividend/quotient register 24 is also used to store a quotient as the result of the division operation. Furthermore, at least the registers 24 and 26 have a data shift function.

Figure 2:
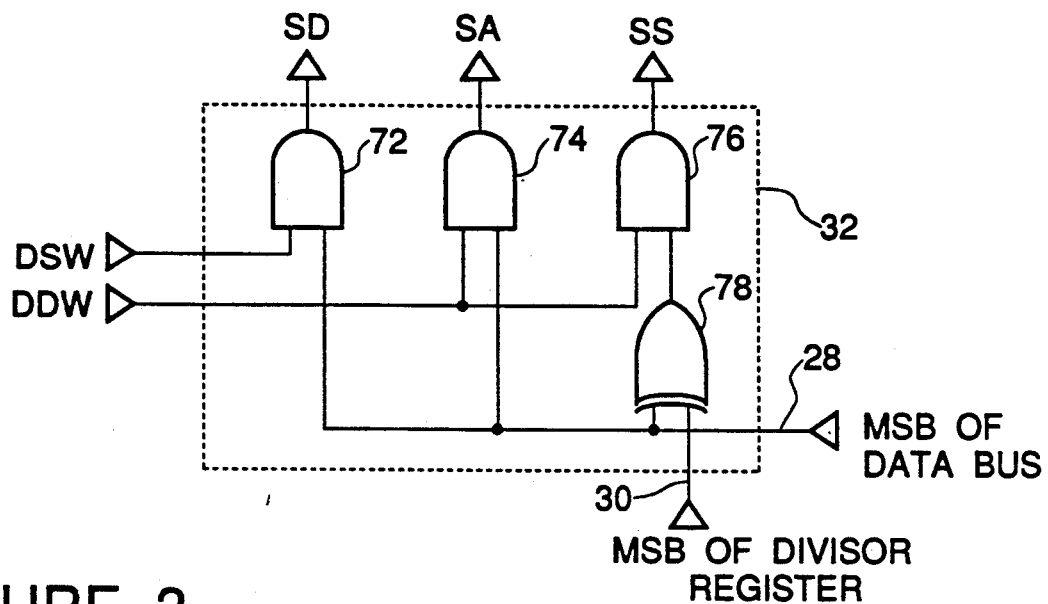
FIG. 2 is a logic circuit diagram of the sign detection circuit included in the instruction execution unit shown in FIG. 1.

The sign detection circuit 32 is composed of three AND gates 72, 74 and 76 and one exclusive-OR gate 78, which are connected as shown in FIG. 2. The AND gate 72 has a first input connected to receive the MSB bit of the data bus 16 through the line 28, and a second input connected to receive the DSW signal from the microsequencer 10. Therefore, when the divisor is written to the divisor register 22, the AND gate 72 outputs the MSB bit of the data bus, namely the sign of the divisor, as a divisor sign information SD. The divisor sign information SD is written to the SD flag 34 in response to the SDW signal from the microprocessor 10.

The AND gate 74 has a first input connected to receive the MSB bit of the data bus 16 through the line 28, and a second input connected to receive the DDW signal from the microsequencer 10. Therefore, when the dividend is written to the dividend register 24, the AND gate 74 outputs the MSB bit of the data bus, namely the sign of the dividend, as a dividend sign information SA. The dividend sign information SA is written to the SA flag 36 in response to the SSAW signal from the microprocessor 10.

The exclusive-OR gate 78 has a first input connected to receive the MSB bit of the data bus 16 through the line 28, and a second input connected to receive the MSB bit of the divisor register 22 through the line 30. An output of the exclusive-OR gate 78 is connected to a first input of the AND gate 76, whose second input is connected to receive the DDW signal from the microsequencer. Therefore, when the dividend is written to the dividend register 24, the exclusive-OR between the MSB or sign bit of the divisor held in the divisor register 22 and the MSB or sign bit of the dividend on the data bus 16 is generated by the exclusive-OR gate 78, and outputted through the AND gate 76 in response to the SSAW signal from the microprocessor 10.

Figure 3:
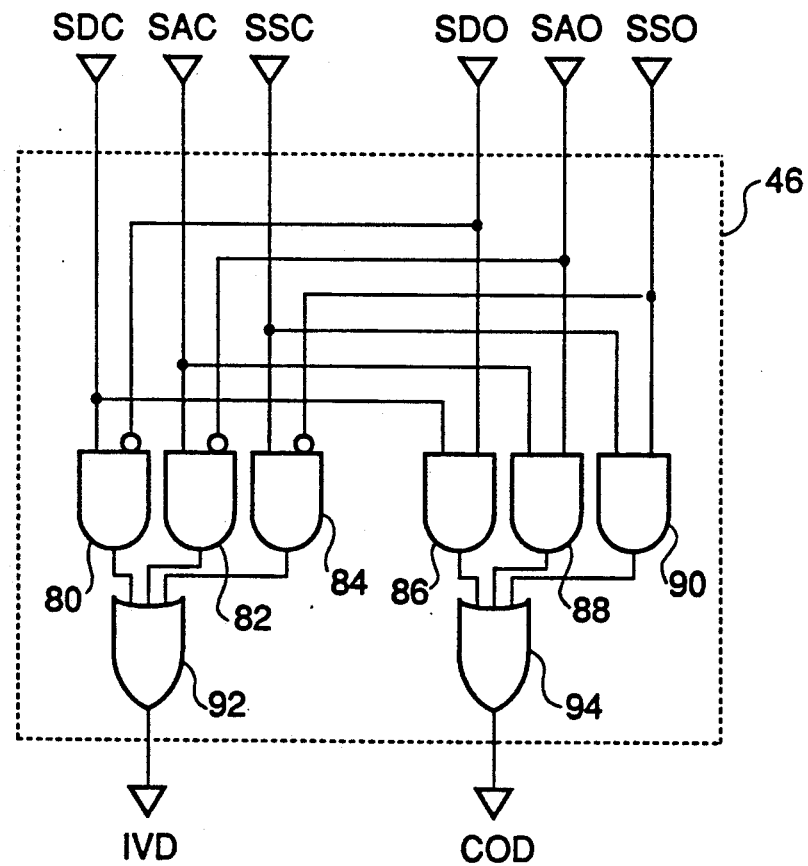
FIG. 3 is a logic circuit diagram of the arithmetic logic operation control circuit included in the instruction execution unit shown in FIG. 1.

The correction operation control circuit 46, which receives the SDO signal, the SAO signal and the SSO signal from the three flags 34, 36 and 38 and the SDC signal, the SAC signal and the SSC signal from the microsequencer 10, includes six AND gates 80, 82, 84, 86, 88 and 90 and two three-input OR gates 92 and 94, connected as shown in FIG. 3.

The AND gate 80 has a first and non-inverted input connected to receive the SDC signal and a second and inverted input connected to receive the SDO signal. The AND gate 82 has a first and non-inverted input connected to receive the SAC signal and a second and inverted input connected to receive the SAO signal. The AND gate 84 has a first and non-inverted input connected to receive the SSC signal and a second and inverted input connected to receive the SSO signal. Three inputs of the OR gate 92 are connected to outputs of the three AND gates 80, 82 and 84, respectively, so that the OR gate 92 generates the operation invalidation signal IVD.

Two inputs of the AND gate 86 are connected to receive the SDC signal and the SDO signal, respectively, and two inputs of the AND gate 88 are connected to receive the SAC signal and the SAO signal, respectively. The AND gate 90 has two inputs connected to receive the SSC signal and the SSO signal, respectively. Three inputs of the OR gate 94 are connected to outputs of the three AND gates 86, 88 and 90, respectively, so that the OR gate 94 generates complement obtaining operation signal COD.

Figure 4:
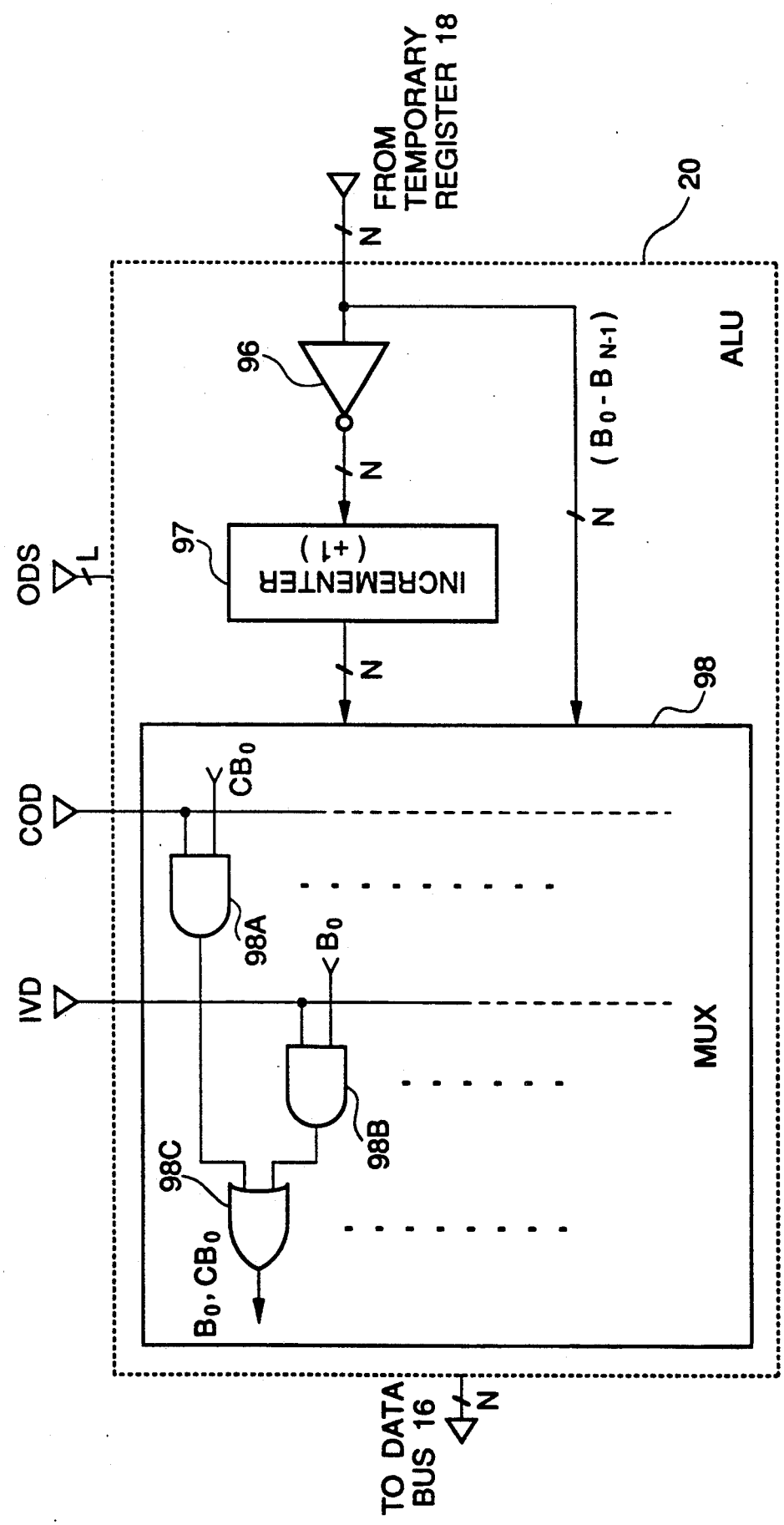
FIG. 4 is a logic equivalent circuit diagram of the arithmetic logic circuit included in the instruction execution unit shown in FIG. 1 when it is controlled to execute a two's complement obtaining operation.

The ALU 20 is controlled by the operation mode disignation signal ODS supplied through the L-bit bus 58 from the microsequencer 10, so that the ALU 20 executes either a monadic operation for one item of data supplied from the temporary register set 18 or a dyadic operation for two items of data supplied from the temporary register set 18. For example, when the microsequencer 10 generates a two's complement obtaining operation mode signal, the ALU 20 assumes an equivalent circuit as shown in FIG. 4. Namely, an N-bit data ($B_0$–$B_{N-1}$) supplied from the temporary register 18 is inverted by an N-bit inverter 96, and fed to an incrementer 97 where the inverted data is added with +1. Accordingly, the incrementer 97 outputs a two's complement data ($CB_0$–$CB_{N-1}$) of the data supplied from the temporary register 18. The two's complement data ($CB_0$–$CB_{N-1}$) is supplied to one input of a multiplexor 98, whose another input is connected to receive the N-bit data ($B_0$–$B_{N-1}$) supplied from the temporary register 18.

The multiplexor 98 includes an N-number of AND gates 98A having their first input connected to a corresponding bit of the two's complement data ($CB_0$–$CB_{N-1}$). Second inputs of all the AND gates 98A are commonly connected to receive the COD signal. Furthermore, the multiplexor 98 includes an N-number of AND gates 98B having their first input connected to a corresponding bit of the N-bit data ($B_0$–$B_{N-1}$) supplied from the temporary register 18. Second inputs of all the AND gates 98B are commonly connected to receive the IVD signal. Outputs of the AND gates 98A and 98B located at the same digit or place are connected to an OR gate 98C, and the outputs of all the OR gates 98C form a N-bit output data, which is supplied to the N-bit data bus 16.

As seen from the above, the AND gates 98A and 98B are controlled by the complement obtaining operation signal COD and the operation invalidation signal IVD, respectively. If the operation invalidation signal IVD is activated, the multiplexor 98 selects the N-bit data ($B_0$–$B_{N-1}$) supplied from the temporary register 18, so that the two's complement derived by cooperation of the inverter 96 and the incrementer 97 is substantially invalidated. On the other hand, if the complement obtaining operation signal COD is activated, the multiplexor 98 selects the two's complement data ($CB_0$–$CB_{N-1}$), with the result that the ALU 20 executes the operation for deriving the the two's complement data.

Figure 5:
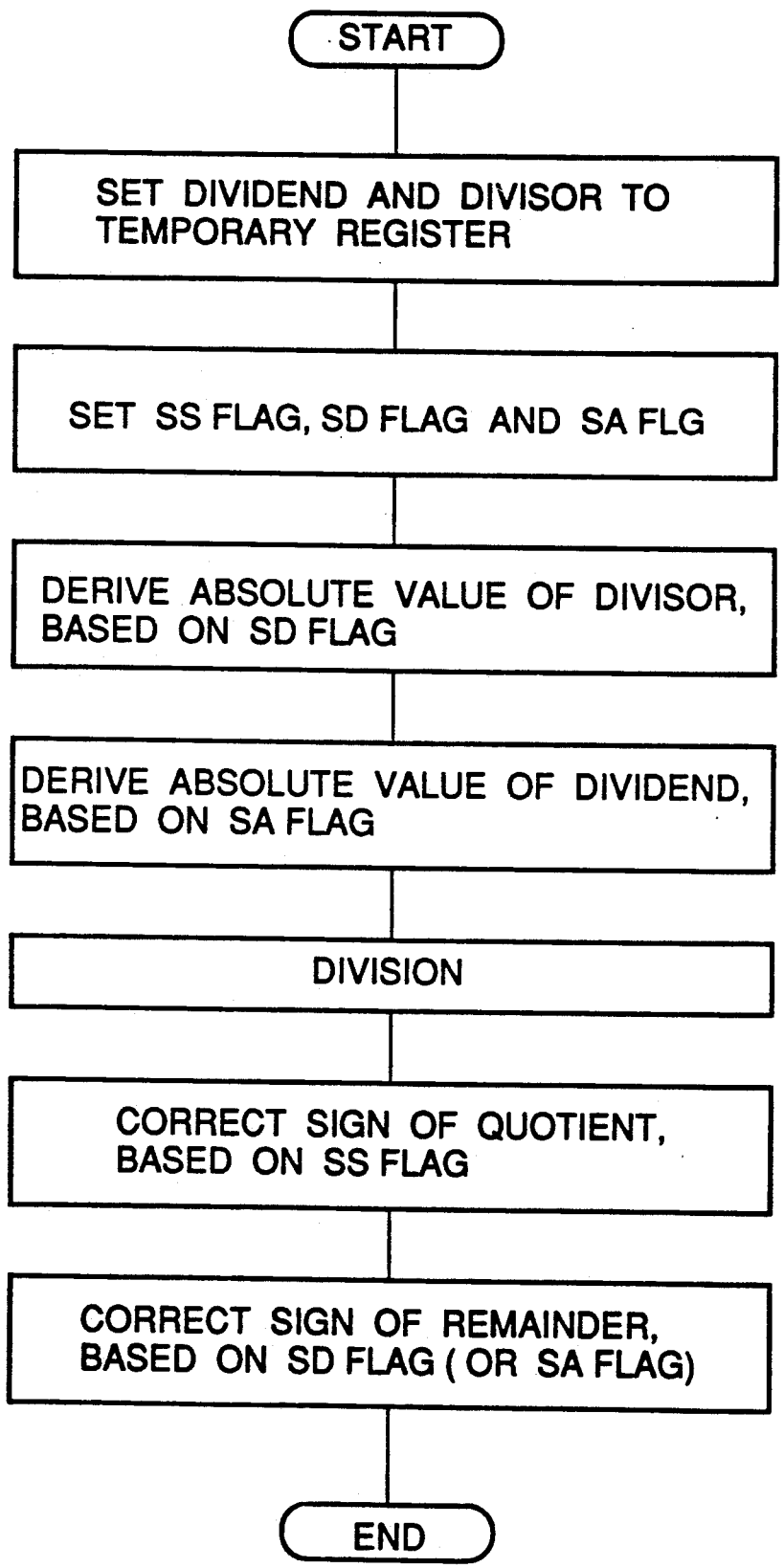
FIG. 5 is a flow chart illustrating the execution of division of signed data controlled by the microsequencer shown in FIG. 1.

Now, assuming that a divisor is negative (MSB="1") and a dividend is positive (MSB="0"), the operation of the execution unit shown in FIG. 1 will be described with reference to FIG. 5 which illustrates a flow chart in accordance with the microprogram of the microsequencer, and with reference to FIG. 6 which shows a timing chart of various signals appearing in the circuit shown in FIG. 1.

When a division instruction is given through the instruction bus 14 to the microsequencer 10, a microprogram required for execution of the division instruction is read from the associated microprogram memory 12, and is started by the microsequencer 10. In the microprogrammed processing for the division operation, the microsequencer 10 firstly controls to read a divisor and a dividend from the data memory 68 or the general purpose registers 70 through the data bus 16 and to write them to the divisor register 22 and the dividend/quotient register 24 of the temporary register set 18. In addition, the sign data of the divisor, the sign data of the dividend and the exclusive-OR therebetween are written to the flags 34, 36 and 38, respectively.

Figure 6:
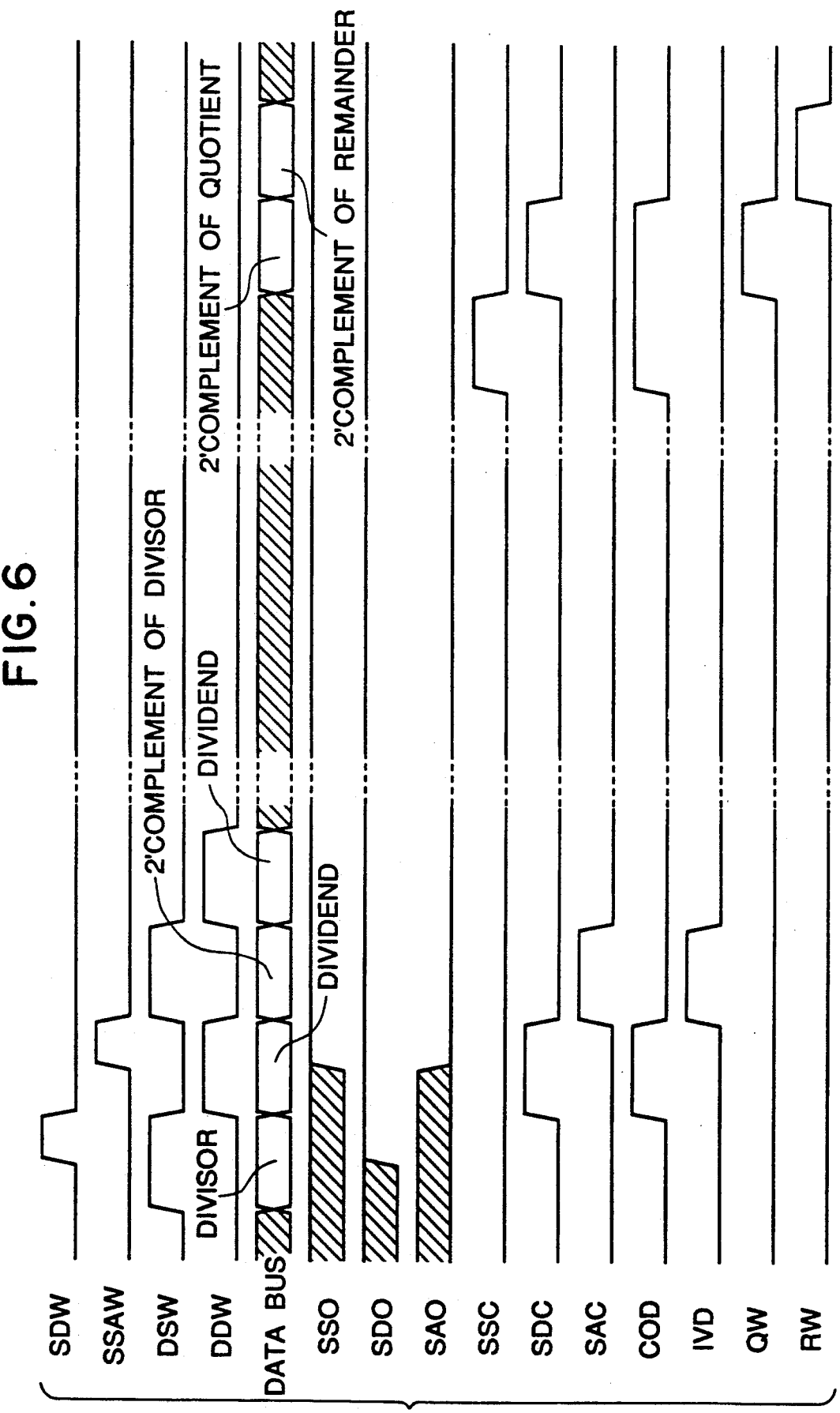
FIG. 6 is a timing chart illustrating the execution of division of signed data controlled by the microsequencer shown in FIG. 1.

More specifically, as shown in FIG. 6, while the microsequencer 10 controls to cause a divisor to be outputted to the data bus 16, the microsequencer 10 outputs an active divisor write signal DSW to the line 60 so as to cause the divisor on the data bus 16 to be written into the divisor register 22. Simultaneously, the AND gate 72 is opened in response to the active DSW signal, so that the MSB of the data on the data bus 16 or the sign bit of the divisor is outputted from the AND gate 72 to the SD flag 34. At a latter half of the active divisor write signal DSW, the microsequencer 10 generates an active SD flag write signal SDW, so that the sign bit of the divisor is written to the SD flag 34. In this case, since the divisor is negative as assumed hereinbefore, the SD signal outputted from the AND gate 72 is "1", and therefore, "1" is written to the SD flag 34 in response to the active SD flag write signal SDW. Thereafter, an output SDO of the SD flag 34 is maintained at "1", as shown in FIG. 6.

After the divisor is written to the divisor register 22 and the SD flag 34 is set, the microsequencer 10 controls to cause a dividend to be outputted to the data bus 16 on one hand, and outputs an active dividend write signal DSW to the line 62 on the other hand as shown in FIG. 6, so that the dividend on the data bus 16 is written into the dividend/quotient register 24. In response to the active DDW signal, furthermore, the AND gates 74 and 76 are opened, so that the MSB of the data on the data bus 16 or the sign bit of the dividend is outputted from the AND gate 74, and the exclusive- OR between the sign bit of the divisor held in the divisor register 22 and the MSB of the data on the data bus 16 is outputted from the exclusive-OR gate 78 through the AND gate 76. At a latter half of the active dividend write signal DDW, the microsequencer 10 generates an active SA/SS flag write signal SSAW, so that the sign bit of the dividend is written to the SA flag 36, and the exclusive-OR between the respective sign bits of the divisor and the dividend is written to the SS flag 38. In this case, since the dividend is positive as assumed hereinbefore, the SA signal outputted from the AND gate 74 is "0", and therefore, "0" is written to the SA flag 36. Furthermore, as mentioned above, since the divisor is negative, the SS signal outputted from the AND gate 76 is "1", and therefore, "1" is written to the SS flag 38. Thereafter, an output SAO of the SA flag 36 is maintained at "0", and an output SSO of the SS flag 38 is maintained at "1", as seen from FIG. 6.

In the course of writing the dividend to the register/quotient register 24, the microsequencer 10 also instructs an absolute value derivation of the divisor. Specifically, the microsequencer 10 outputs an operation mode designation signal ODS designating a two's complement obtaining operation, through the bus 58 to the ALU 20, and at the same time, the microsequencer 10 generates an active divisor's two's complement obtaining operation signal SDC in phase with the DDW signal, as seen from FIG. 6. This SDC signal is inputted to the temporary register set 18 as a data read signal for reading and outputting a content of the divisor register 22 to the ALU 20. As a result, the divisor is supplied to the ALU 20. On the other hand, the SDC signal supplied to the correction operation control circuit 46 is inputted to the AND gates 80 and 86, so that these AND gates are opened. In this condition, since the SDO signal of the SD flag 34 is "1", the output of the AND gate 86 is brought to "1", and therefore, the two's complement obtaining operation signal COD is also brought to "1". On the other hand, the operation invalidation signal IVD is maintained at "0". As a result, the multiplexer 98 selects the two's complement of the divisor generated by the inverter 96 and the incrementer 97.

After the writing of the dividend into the dividend register 24 has been completed, namely, at a tailing edge of the DDW signal, the ALU 20 outputs the two's complement data of the divisor to the data bus 16, as shown in FIG. 6. At this time, the microprocessor 10 generates the divisor write signal DSW, again, so that the two's complement data of the divisor, namely, the absolute value of the divisor is written to the divisor register 22.

Concurrently, the microsequencer 10 also instructs an absolute value derivation of the dividend. Namely, the microsequencer 10 generates an active dividend's two's complement obtaining operation signal SAC in phase with the active DSW signal, as seen from FIG. 6. This SAC signal is inputted to the temporary register set 18 as a data read signal for reading and outputting a content of the dividend/quotient register 24 to the ALU 20, so that the dividend is supplied to the ALU 20. On the other hand, the SAC signal is inputted to the AND gates 82 and 88 of the correction operation control circuit 46, so that these AND gates are opened. In this condition, since the SAO signal of the SA flag 36 is "0", the output of the AND gate 82 is brought to "1", and therefore, the invalidation operation signal IVD is brought to "1". On the other hand, the two's complement obtaining operation signal COD is maintained at "0". As a result, the multiplexor 98 selects the dividened outputted from the temporary register set 18. In other words, calculation of the two's complement of the dividend in the ALU 20 will be invalidated.

After the writing of the divisor's two's complement into the divisor register 22 has been completed, the ALU 20 outputs the dividend outputted from the temporary register set 18, to the data bus 16 without any modification, as shown in FIG. 6. At this time, the microprocessor 10 generates the dividend write signal DDW, again, so that the the dividend on the data bus 16 is written to the dividend register 24.

Thus, the absolute values of the divisor and the dividend have been prepared. As seen from comparison between the above mentioned embodiment and the conventional example described hereinbefore, the above mentioned embodiment has no microprogram step for detecting the sign information of the divisor and the dividend, on the one hand, and automatically determines whether an operation for deriving a two's complement for the purpose of obtaining an absolute value should be executed or invalidated, on the other hand. With this feature, the number of microprogram steps can be decreased, and the operation speed can be made higher.

After the absolute values of the divisor and the dividend have been prepared, a division operation is executed for the divisor and the dividend expressed in the form of an absolute value. This division operation is executed by the restoring method by utilizing the shift function of the registers 24 and 26 and the ALU 20. However, since the division operation in accordance with the restoring method is well known to persons skilled in the art, and since the gist of the present invention is not directed to the division operation itself, a detailed description will be omitted. In the course of the division operation, the ALU 20 is controlled by the operation mode designation signal ODS from the microsequencer 10 so that the ALU 20 functions as a subtracter, and a quotient and a remainder generated as the result of the division operation are stored in the registers 24 and 26, respectively.

After the division operation has been executed, the microsequencer 10 executes the correction of the sign of the obtained quotient in accordance with the value of the SS flag. For this purpose, the microsequencer supplies the ALU 20 with the operation mode designation signal ODS for instructing the two's complement obtaining operation mode, and generates an active quotient's two's complement obtaining instruction signal SSC, as shown in FIG. 6. This SSC signal is inputted to the temporary register set 18 as a data read signal for reading and outputting a content of the dividend/quotient register 24 to the ALU 20, so that the quotient is supplied to the ALU 20. On the other hand, the SSC signal is also inputted to the AND gates 84 and 90 of the correction operation control circuit 46, so that these AND gates are opened. In this example, since the SSO signal of the SS flag 38 is "1", the output of the AND gate 90 is brought to "1", and therefore, the complement obtaining operation signal COD is brought to "1". Accordingly, the multiplexor 98 selects the two's complement of the quotient. At a tailing edge of the SSC signal, the ALU 20 outputs the two's complement of the quotient to the data bus 16. On the other hand, the microsequencer 10 generates the quotient write signal QW after the SSC signal falls down but while the COD signal is still active. This QW signal is supplied through the line 64 to the temporary register set 18, so that the two's complement of the quotient on the data bus 16 is written to the dividend/quotient register 24.

In the course of writing the two's complement of the quotient to the register/quotient register 24, the microsequence 10 starts an operation for correction of the remainder on the basis of the value of the SD flag 34. Incidentally, the sign of the remainder can be corrected not only on the basis of the value of the SD flag (namely, the sign of the divisor) but also on the basis of the value of SA flag (namely, the sign of the dividend). Whether the sign of the remainder is corrected on the basis of the SD flag or on the basis of the SA flag, cannot be uniformly determined, but is dependent upon an actual architecture of each data processor. In the shown example, the sign of the remainder is corrected on the basis of the SD flag.

For this purpose, the microsequencer 10 generates the remainder's two's complement obtaining operation signal SDC in phase with the quotient write signal QW. In this step, the SDC signal is inputted to the temporary register set 18 as a data read signal for reading and outputting a content of the remainder register 26 to the ALU 20, so that the remainder is supplied to the ALU 20. On the other hand, the SDC signal supplied to the correction operation control circuit 46 is inputted to the AND gates 80 and 86, so that these AND gates are opened. In this condition, since the SDO signal of the SD flag 34 is "1", the output of the AND gate 86 is brought to "1", and therefore, the two's complement obtaining operation signal COD is also brought to "1". Namely, the COD signal is maintained in an active condition.

As a result, the multiplexor 98 selects the two's complement of the remainder generated by the inverter 96 and the incrementer 97, so that the two's complement of the remainder is outputted onto the data bus 16. Thereafter, in response to the remainder write signal RW from the microsequencer 10, the two's complement of the remainder on the data bus 16 is written to the remainder register 26.

Thus, the sign corrections of the quotient and the remainder have been completed. In the course of the sign corrections of the quotient and the remainder, since the microprogram includes no branch processing, the program step number can be decreased, and the operation speed can be improved.

In the above mentioned embodiment, whether or not a two's complement obtaining operation should be executed is controlled by the correction operation control circuit 46 for all of the divisor, the dividend, the quotient and the remainder. However, the two's complement obtaining operation may be limited to only the divisor and the dividend, or to only the quotient and the remainder.

As seen from the above description of the preferred embodiment with reference to the drawings, the data processor in accordance with the present invention is characterized by a combination of means for storing the sign data of the divisor and the dividend, with means responding to the sign data storing means for controlling whether or not a complement data operation instructing signal should be supplied to an ALU. With this feature, the data processor in accordance with the present invention can execute the division operation of signed data with a reduced number of program steps and at an increased operation speed.

The invention has thus been shown and described with reference to the specific embodiments. However, it should be noted that the present invention is in no way limited to the details of the illustrated structures but changes and modifications may be made within the scope of the appended claims.

I claim:

1. A data processor comprising data storage means for temporarily storing a dividend data and a divisor data, sign information storage means coupled to said data storage means for detecting a sign of each of said dividend data and said divisor data and storing the detected sign information, arithmetic and logic operation execution means coupled to said data storage means and having an arithmetic logic operation function required for execution of a division operation and a two's compliment obtaining operation, instruction execution control means coupled to said arithmetic and logic operation execution means for controlling said arithmetic and logic operation execution means so as to cause said arithmetic and logic operation execution means to execute a given instruction, said instruction execution control means generating a two's complement obtaining operation instruction signal, and operation control means coupled to said sign information storage means and to receive said two's complement obtaining operation instruction signal, said operation control means operating to control said arithmetic and logic operation execution means in accordance with an output of said sign information storage means so as to cause said arithmetic and logic operation execution means to execute a two's complement obtaining operation, or to substantially invalidate said two's complement obtaining operation of said arithmetic and logic operation execution means regardless of said two's complement obtaining operation instruction signal.

2. A data processor claimed in claim 1 wherein said data storage means is composed of a temporary register set connected to a data bus and including a divisor register and a dividend register, and said sign information storage means includes a sign detection circuit, a divisor sign flag and a dividend sign flag, said sign detection circuit having an input connected to said data bus and an output connected to said divisor sign flag and said dividend sign flag, so that when said divisor data is written from said data bus to said divisor register of said temporary register set, said sign detection circuit detects a sign of said divisor data and writes the detected sign to said divisor sign flag, and when said dividend data is written from said data bus to said dividend register of said temporary register set, said sign detection circuit detects a sign of said dividend data and writes the detected sign to said dividend sign flag.

3. A data processor claimed in claim 2 wherein said instruction execution control means operates to cause said divisor data to be written from said data bus to said divisor register and concurrently to cause said sign detection circuit to detect a sign of said divisor data so as to write the detected sign to said divisor sign flag, and thereafter to cause said dividend data to be written from said data bus to said dividend register and concurrently to cause said sign detection circuit to concurrently detect a sign of said dividend data so as to write the detected sign to said dividend sign flag, said instruction execution control means also operating, when said dividend data is written from said data bus to said dividend register, to generate said two's complement obtaining operation instruction signal and concurrently to cause said divisor data held in said divisor register to be outputted to said arithmetic and logic operation execution means, and wherein said operation control means is coupled to said divisor sign flag, and operates to cause said arithmetic and logic operation execution means to execute said two's complement obtaining operation for said divisor if said divisor sign flag indicates that said divisor data is negative when said two's complement obtaining operation instruction signal is generated, whereby a two's complement of said divisor data is outputted from said arithmetic and logic operation execution means when said dividend data is written to said dividend register, said operation control means also operating to cause to substantially invalidate said two's complement obtaining operation of said arithmetic and logic operation execution means if said divisor sign flag indicates that said divisor data is positive even if said two's complement obtaining operation instruction signal is generated.

4. A data processor claimed in claim 3 wherein said operation control means is also coupled said dividend sign flag, and wherein after said instruction execution control means has caused said dividend data to be written from said data bus to said dividend register, said instruction execution control means also operates to cause said two's complement of said divisor data outputted from said arithmetic and logic operation execution means, to be written through said data bus to said divisor register, and simultaneously to generate said two's complement obtaining operation instruction signal and at the same time to cause said dividend data held in said dividend register to be outputted to said arithmetic and logic operation execution means, so that, if said dividend sign flag indicates that said dividend data is negative when said two's complement obtaining operation instruction signal is generated, said operation control means operates to cause said arithmetic and logic operation execution means to execute said two's complement obtaining operation for said dividend data, whereby a two's complement of said dividend data is outputted from said arithmetic and logic operation execution means when two's complement of said divisor is written to said divisor register, and if said dividend sign flag indicates that said dividend data is positive even if said two's complement obtaining operation instruction signal is generated, said operation control means operates to cause to substantially invalidate said two's complement obtaining operation of said arithmetic and logic operation execution means.

5. A data processor claimed in claim 1 wherein said data storage means is composed of a temporary register set connected to a data bus and including a divisor register, a dividend register, a quotient register and a remainder register, and said sign information storage means includes a sign detection circuit, a divisor sign flag, a dividend sign flag and a quotient sign flag, said sign detection circuit having an input connected to said data bus and said divisor register and an output connected to said divisor sign flag, said dividend sign flag and said quotient sign flag, so that when said divisor data is written from said data bus to said divisor register of said temporary register set, said sign detection circuit detects a sign of said divisor data and writes the detected sign to said divisor sign flag, and when said dividend data is written from said data bus to said dividend register of said temporary register set, said sign detection circuit detects a sign of said dividend data and writes the detected sign to said dividend sign flag, and at the same time, said sign detection circuit detects a sign of a possible quotient on the basis of said sign of said dividend data on said data bus and a sign of said divisor data held in said divisor register, said sign detection circuit then operating to write the detected sign of the possible quotient to said quotient sign flag.

6. A data processor claimed in claim 5 wherein said instruction execution control means operates to cause said divisor data to be written from said data bus to said divisor register and concurrently to cause said sign detection circuit to detect a sign of said divisor data so as to write the detected sign to said divisor sign flag, and thereafter to cause said dividend data to be written from said data bus to said dividend register and concurrently to cause said sign detection circuit to concurrently detect a sign of said dividend data so as to write the detected sign to said dividend sign flag, said instruction execution control means also operating, when said dividend data is written from said data bus to said dividend register, to generate said two's complement obtaining operation instruction signal and concurrently to cause said divisor data held in said divisor register to be outputted to said arithmetic and logic operation execution means, and wherein said operation control means is coupled to said divisor sign flag, and operates to cause said arithmetic and logic operation execution means to execute said two's complement obtaining operation for said divisor if said divisor sign flag indicates that said divisor data is negative when said two's complement obtaining operation instruction signal is generated, whereby a two's complement of said divisor data is outputted from said arithmetic and logic operation execution means when said dividend data is written to said dividend register, said operation control means also operating to cause to substantially invalidate said two's complement obtaining operation of said arithmetic and logic operation execution means if said divisor sign flag indicates that said divisor data is positive even if said two's complement obtaining operation instruction signal is generated.

7. A data processor claimed in claim 6 wherein said operation control means is also coupled said dividend sign flag, and wherein after said instruction execution control means has caused said dividend data to be written from said data bus to said dividend register, said instruction execution control means also operates to cause said two's complement of said divisor data outputted from said arithmetic and logic operation execution means, to be written through said data bus to said divisor register, and simultaneously to generate said two's complement obtaining operation instruction signal and at the same time to cause said dividend data held in said dividend register to be outputted to said arithmetic and logic operation execution means, so that, if said dividend sign flag indicates that said dividend data is negative when said two's complement obtaining operation instruction signal is generated, said operation control means operates to cause said arithmetic and logic operation execution means to execute said two's complement obtaining operation for said dividend data, whereby a two's complement of said dividend data is outputted from said arithmetic and logic operation execution means when two's complement of said divisor is written to said divisor register, and if said dividend sign flag indicates that said dividend data is positive even if said two's complement obtaining operation instruction signal is generated, said operation control means operates to cause to substantially invalidate said two's complement obtaining operation of said arithmetic and logic operation execution means.

8. A data processor claimed in claim 7 wherein said operation control means is also coupled said quotient sign flag, and wherein after the division operation has been completed and a quotient and a remainder obtained are stored in said quotient register and said remainder register, said instruction execution control means operates to generate said two's complement obtaining operation instruction signal and at the same time to cause said quotient data held in said quotient register to be outputted to said arithmetic and logic operation execution means, so that, if said quotient sign flag indicates that said possible quotient data is negative when said two's complement obtaining operation instruction signal is generated, said operation control means operates to cause said arithmetic and logic operation execution means to execute said two's complement obtaining operation for said quotient, whereby a two's complement of said quotient is outputted from said arithmetic and logic operation execution means, and if said quotient sign flag indicates that said quotient data is positive even if said two's complement obtaining operation instruction signal is generated, said operation control means operates to cause to substantially invalidate said two's complement obtaining operation of said arithmetic and logic operation execution means.

9. A data processor claimed in claim 7 wherein after said two's complement of said quotient is outputted from said arithmetic and logic operation execution means, said instruction execution control means operates to cause said two's complement of said quotient outputted from said arithmetic and logic operation execution means, to be written through said data bus to said quotient register, and simultaneously to generate said two's complement obtaining operation instruction signal and at the same time to cause said remainder held in said remainder register to be outputted to said arithmetic and logic operation execution means, so that, if said divisor sign flag indicates that said divisor data is negative when said two's complement obtaining operation instruction signal is generated, said operation control means operates to cause said arithmetic and logic operation execution means to execute said two's complement obtaining operation for said remainder, whereby a two's complement of said remainder is outputted from said arithmetic and logic operation execution means when two's complement of said quotient is written to said quotient register, and if said divisor sign flag indicates that said divisor data is positive even if said two's complement obtaining operation instruction signal is generated, said operation control means operates to cause to substantially invalidate said two's complement obtaining operation of said arithmetic and logic operation execution means.

10. A data processor comprising a temporary register set for temporarily storing at least a dividend and a divisor; sign flags for indicating respective signs of said dividend and said divisor, an arithmetic and logic unit coupled to said temporary register and having an arithmetic logic operation function required for execution of a division operation and a two's complement obtaining operation, a microsequencer for controlling said arithmetic and logic unit so as to cause said arithmetic and logic unit to execute a given instruction, said microsequencer generating a two's complement obtaining operation instruction signal, and an operation control circuit coupled to the sign flags and connected to receive the two's complement obtaining operation instruction signal, said operation control circuit operating to control said arithmetic and logic unit so as to cause said arithmetic and logic unit to execute a two's complement obtaining operation when said sign flags indicates negative, or to substantially invalidate the two's complement obtaining operation of the ALU when said sign flags indicates positive, regardless of said two's complement obtaining operation instruction signal.

* * * * *